US011082466B2

(12) United States Patent
Brunson (10) Patent No.: US 11,082,466 B2
(45) Date of Patent: Aug. 3, 2021

(54) ACTIVE TALKER ACTIVATED CONFERENCE POINTERS (71) Applicant: Avaya, Inc., Basking Ridge, NJ (US)

(72) Inventor: Gordon R. Brunson, Broomfield, CO (US)

(73) Assignee: Avaya Inc., Basking Ridge, NJ (US)

(*) Notice: Subject to any disclaimer, the term of this patent is extended or adjusted under 35 U.S.C. 154(b) by 876 days.

(21) Appl. No.: 14/137,544

(22) Filed: Dec. 20, 2013

(65) Prior Publication Data
US 2015/0180919 A1 Jun. 25, 2015

(51) Int. Cl.
*H04L 29/06* (2006.01)
*H04L 12/18* (2006.01)

(52) U.S. Cl.
CPC ...... *H04L 65/4046* (2013.01); *H04L 12/1822* (2013.01); *H04L 65/4038* (2013.01)

(58) Field of Classification Search
CPC .................. H04L 65/4096; H04L 65/4046
USPC ........................................................ 709/204
See application file for complete search history.

(56) References Cited

U.S. PATENT DOCUMENTS

| 6,795,106 | B1* | 9/2004 | Cooper ................. H04N 7/147 348/14.07 |
| 7,408,890 | B1* | 8/2008 | Doran et al. ................. 370/261 |
| 2004/0143796 | A1 | 7/2004 | Lerner et al. |
| 2004/0237033 | A1 | 11/2004 | Woolf et al. |
| 2005/0078171 | A1* | 4/2005 | Firestone et al. ........... 348/14.08 |
| 2006/0041564 | A1 | 2/2006 | Jain et al. |
| 2006/0248210 | A1* | 11/2006 | Kenoyer ....................... 709/231 |
| 2008/0046823 | A1* | 2/2008 | Korbin ................... G06Q 40/02 715/733 |
| 2009/0264114 | A1* | 10/2009 | Virolainen .............. H04M 3/56 455/416 |
| 2009/0268008 | A1* | 10/2009 | Topits ................... H04M 3/567 348/14.09 |
| 2010/0153497 | A1* | 6/2010 | Sylvain et al. ............... 709/204 |
| 2010/0246570 | A1 | 9/2010 | Chavez et al. |
| 2010/0283829 | A1* | 11/2010 | De Beer ................ H04N 7/152 348/14.09 |

(Continued)

FOREIGN PATENT DOCUMENTS

WO WO 00/079791 12/2000

OTHER PUBLICATIONS

U.S. Appl. No. 14/137,428, filed Dec. 20, 2013, Brunson.

(Continued)

*Primary Examiner* — Brian J. Gillis
*Assistant Examiner* — Jsing Forng Lin
(74) *Attorney, Agent, or Firm* — Sheridan Ross P.C.

(57) ABSTRACT

Provided herein are system and methods whereby a speaker in a webconference may take control of a pointer that is visible to other participants of the webconference. Speaker detection identifies the speaker, or "active talker," and then provides, or offers, pointer control to the detected speaker. The speaker may then be able to utilize their client device's input device, such as a mouse, touchpad, or other pointer control mechanism to control a common pointer visible to the other participants of the webconference. The a host of the webconference maintains control of the other aspects of the webconference, as well, administrative control of the pointer and may, for example, rescind pointer assignment given to a particular "active talker."

17 Claims, 5 Drawing Sheets

(56) References Cited

U.S. PATENT DOCUMENTS

| | | | |
|---|---|---|---|
| 2011/0038362 A1* | 2/2011 | Vos et al. | 370/352 |
| 2011/0126127 A1 | 5/2011 | Mariotti et al. | |
| 2011/0141221 A1* | 6/2011 | Satterlee et al. | 348/14.08 |
| 2011/0270923 A1* | 11/2011 | Jones | G06F 3/0421 709/204 |
| 2011/0320044 A1* | 12/2011 | Smith | G06F 3/04847 700/276 |
| 2012/0182384 A1* | 7/2012 | Anderson et al. | 348/14.09 |
| 2013/0314491 A1* | 11/2013 | Vivekanandan et al. | 348/14.08 |
| 2014/0006974 A1* | 1/2014 | Bell et al. | 715/753 |
| 2014/0340468 A1* | 11/2014 | Winterstein | H04N 7/15 348/14.08 |
| 2015/0007060 A1* | 1/2015 | Nielsen | H04L 65/4038 715/753 |
| 2015/0032809 A1* | 1/2015 | Xie | H04L 65/1083 709/204 |
| 2015/0149195 A1* | 5/2015 | Rose | H04L 65/4015 705/2 |

OTHER PUBLICATIONS

Official Action for U.S. Appl. No. 14/137,428, dated Aug. 25, 2015, 11 pages.

Official Action for U.S. Appl. No. 14/137,428, dated Feb. 12, 2016 11 pages.

Official Action for U.S. Appl. No. 14/137,428, dated Jun. 1, 2016 13 pages.

Official Action for U.S. Appl. No. 14/137,428, dated Nov. 29, 2016 15 pages.

Official Action for U.S. Appl. No. 14/137,428, dated Apr. 12, 2017 14 pages.

Official Action for U.S. Appl. No. 14/137,428, dated Sep. 19, 2017 15 pages.

Notice of Allowance for U.S. Appl. No. 14/137,428, dated Jul. 2, 2018 9 pages.

Corrected Notice of Allowance for U.S. Appl. No. 14/137,428, dated Jul. 25, 2018 7 pages.

* cited by examiner

ACTIVE TALKER ACTIVATED CONFERENCE POINTERS

FIELD OF THE DISCLOSURE

The present disclosure is generally directed toward collaboration solutions. More specifically, the present disclosure is directed toward sharing control of pointers and the like in a real-time collaboration session, such as a webconference.

BACKGROUND

When groups of people review or collaborate on a common diagram or document in a meeting supported by web-conferencing, often only one or a small number of presenters are allowed to manipulate the pointers and contents of the presentation window at any given time. The presenter is often challenged in obtaining commentary on specific elements of the document being shared. Certain webconferencing solutions allow full simultaneous access to the content by making all participants editors of the document, but this quickly becomes a confusing and unstable model prone to editing conflicts with more than two participants. Most conferences are run with a single presenter (aka "conference host") in total control of the shared content, and the participants are forced to describe locations within the document or shared slide using long descriptive sentences counting paragraphs, lines, boxes, etc. and giving location directions such as above, below, to the left of, to the right of, etc. If the non-host speaker wants to point, then floor control or presentership, must be passed from one participant to another. This is generally a poorly understood multi-step process which the participant must be guided through. During which, the flow of the meeting is disrupted and distracted from the concepts being discussed in the meeting.

SUMMARY

It is with respect to the above issues and other problems that the embodiments presented herein were contemplated.

In a first embodiment, a method is disclosed, comprising: establishing a collaboration session between a first and second user, the collaboration session having an audio portion and a visual portion; monitoring activity on the audio portion; determining that the second user is active on the audio portion; and in response to determining that the second user is active on the audio portion, transferring pointer control, of a pointer of the visual portion, from the first user to the second user, thereby enabling the second user to affect the visual portion.

In a second embodiment, a system is disclosed, comprising: a server operable to present an audio portion of a collaboration session on an audio channel and a visual portion of the collaboration session on a video channel, the visual portion having a pointer; a speaker detection module operable to determine an active user from a number of users is active on the audio portion; and a pointer control assignment module operable to assign control of the pointer to the active user.

In a third embodiment, a non-transitory medium is disclosed with instructions stored thereon that, when executed by a machine, cause the machine to perform: establishing a collaboration session with a first and second user, the collaboration session having an audio portion delivered via an audio channel and a visual portion, including a pointer, delivered via a video channel, and the visual portion being controlled by the first user; monitoring the audio portion; determining the second user is active on the monitored audio portion; and upon the second user being active on the audio portion, transferring control of the pointer of the video portion to the second user.

In a fourth embodiment, a solution is provided that allows any participant to obtain control over a pointer or the like during a real-time conference by speaking and becoming the active speaker of the conference. Once in control of the pointer, the participant is allowed to point while they are talking and to say things like, "this," "right here," "there," "these," "over here," etc. and have these words be meaningful based on the pointers that all in the conference are seeing. Today these phrases are rarely heard from any participant in a webconference because of the inability to easily point while reviewing the content presented by others.

The audio channel of most collaboration solutions (e.g., webconferences) already supports the concept of highly interactive, "taking of turns" allowing all participants to contribute to the discussion and shaping the outcomes of the meeting. It is natural in a meeting setting to hold the attention of the audience by speaking, and then to cede the attention of the meeting to another participant by allowing them their turn to speak. Certain embodiments proposed herein use this active speaker indication associated with most prior art webconference sessions to automatically gate pointer movements of each participant when the pointer is within the webconference sharing window. As each participant speaks and becomes the active speaker, then the speaking participant gains the ability to point as well.

In a fifth embodiment, a conventional webconferencing solution is first employed, where the web component is aware of the audio conferencing component such that active talker indications are presented on-screen. The webconferencing solution is then modified to detect when the active taker indication matches the identity of the client. This means that the user of the client is speaking and has "won" the attention of the audio conference. Upon detecting this condition, the webconferencing client will detect pointer movement or gestures within the presentation viewing window area and send these pointer movements to the webconferencing server. The webconferencing server will gate these movements on through to the visual output stream viewed by all conference participants.

In a sixth embodiment, additional functionality can be added for mouse clicks and gestures detected during the active talker state. For example, a mouse click can cause the pointer to momentarily balloon and collapse to normal size to attract attention to the position of the pointer on the screen without permanently obscuring the content behind that is being pointed to. Holding the click could cause a magnification of a portion of the screen around the pointer.

When the active speaker indicator passes to another participant, the pointer is removed from the screen, and there is no persistent change made to the document being changed. Recordings of the conference experience would, of course, capture the pointer indications as part of the visual stream of the conference.

In a seventh embodiment, the transfer of control of a webconference is limited to just the pointer instead of giving full control of the webconference to any participant. This means that the floor control over the webconference can be shared separately because the presentation of slides and the actual media is still controlled by the host whereas the active speaker may be allowed to have control over the pointer. This enables the speaking participant to point while they are talking, but doesn't relinquish the full control of the webconference over to the speaker. In another embodiment, the host is provided with the ability to turn on and off the pointer sharing feature. This could be done when the conference begins or the host may be asked whether they want to share pointing control with another participant each time the active speaker changes. Other variants of how and when pointing control are shared can also be envisioned. Additional embodiments are also provided.

The term "video" as used herein, may include one or more of live or recorded dynamic images, the visual portion of a multimedia display, text, graphics, or other data capable of being presented on the display of an electronic device, such as a computer display, smartphone screen, laptop display, tablet computer, projector, etc.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification of the description shall take precedent.

Figure 1:
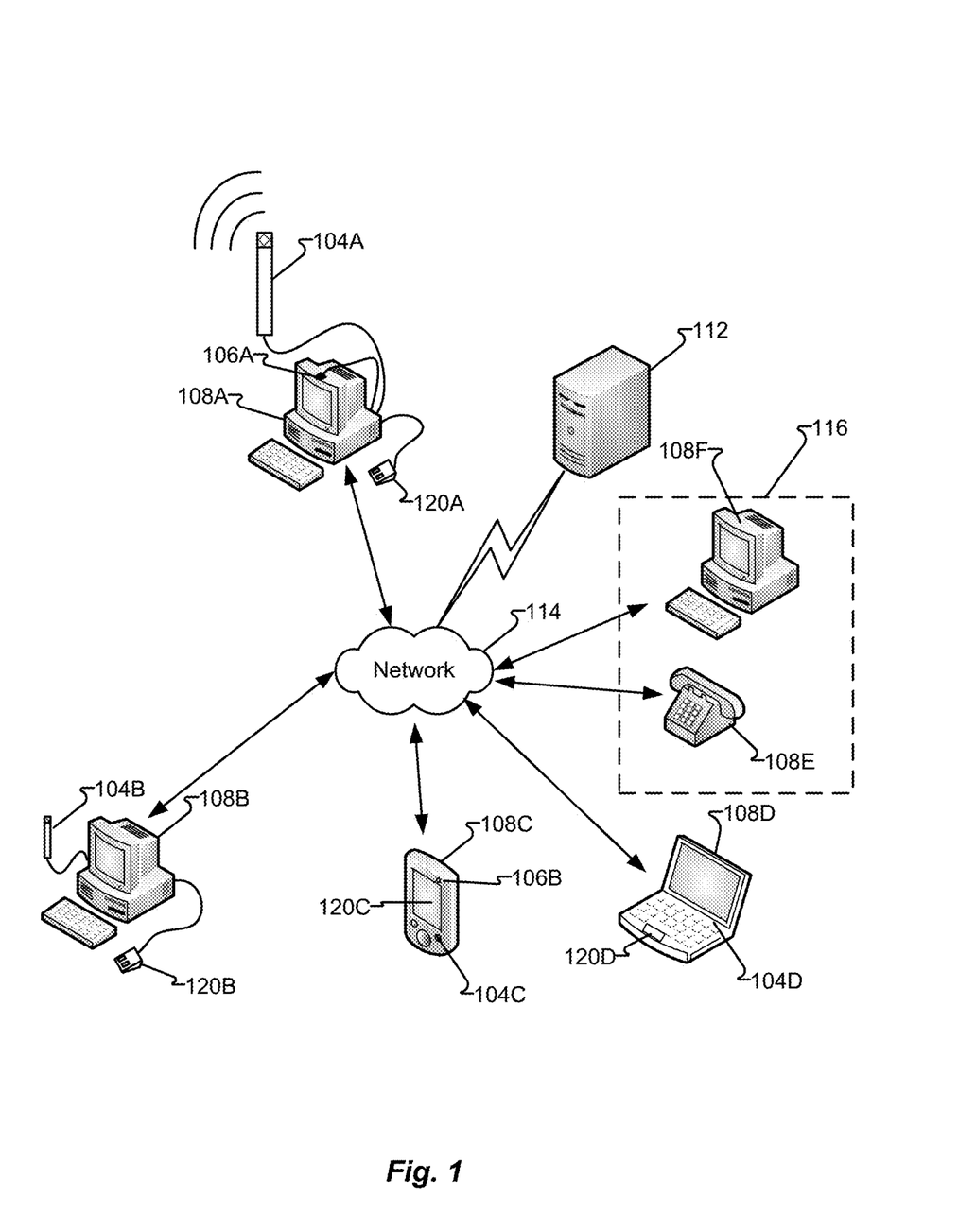
FIG. 1 depicts a collaboration system in accordance with embodiments of the present disclosure.

With reference now to FIG. 1, an illustrative collaboration system 100 will be described in accordance with embodiments of the present disclosure. For ease of understanding, the collaboration system 100 will be described primarily as a webconferencing system, but it should be appreciated that embodiments of the present disclosure are not so limited. Instead, the concepts disclosed herein can be applied to any type of multi-channel collaboration. It is with respect to certain embodiments described herein whereby control of one aspect of one channel, such as a real-time pointer displayed in association with the content delivered via a visual channel, may be determined by actions on another channel, such as by speaking on an audio channel.

In one embodiment a number of devices 108A-108F are logically connected to network 114. Network 114 is shown as a single uniform entity for convenience only. Network 114 may a single uniform entity or be, or comprise portions of one or more of, a private data network (e.g., Ethernet), public data network (e.g., Internet), wired and/or wireless (e.g., WiFi, WiMax, cellular voice and/or data, ZigBee, BlueTooth, etc.), telephone network (e.g., VoIP, public switched network, plain old telephone service, etc.) and other information networks. Network 114 may be distinct from other components 108A-108F, as shown, or integrated with one or more such components operable to convey at least the data portion of a webconference to a number of participants To participate in a webconference, a user needs appropriate hardware to receive the respective components of the webconference presentation. Devices 108A-F may comprise their standard commercial embodiment and/or customized variants thereof. Certain features of devices 108A-108F are described herein to illustrate a particular aspect or embodiment while other features of devices 108A-108F may not be described as they are well-known features thereof. As one example, computers and telephones are generally known to be operable to present sound and audio via an internal speaker, external speaker, headset or other sound-producing device. Accordingly, speakers are one example of a well-known feature of devices 108A-108F omitted from the figures.

In one embodiment, server 112 provides certain functions of a webconference. Server 112 functions may include one or more of administrative functions (e.g., providing access to authorized users, streaming the content of the webconference, connecting and tear-down of connections, storage of data files, etc.). Server 112 may be distinct from devices 108A-108D and 108F or integrated, in whole or in part, within one or more of devices 108A-108D and 108F.

Devices 108A-108F illustrate a portion of the devices that may be used to access a webconference via network 114. In one embodiment, devices 108A-108F connect to network 114 to participate in a webconference. In one embodiment, device 108A is a personal computer with functionality to present the visual and audio portions of the webconference to a participant. Device 108A further comprises input device 120A, embodied as a computer mouse, microphone 104A, and camera 106A and thereby allow the participant using device 108A to contribute audio and/or visual content as well. Visual content may be the output of camera 106A, a visual representation of a file, a real-time graphic, text, or other displayable content presented by device 108A.

Device 108B may be embodied as a personal computer with input device 120B and microphone 104B. Device 120C may be embodied as a handheld computer (e.g., personal data assistant, tablet computer, smartphone, etc.). Device 120C also includes microphone 104C, camera 106B, and input device 120C embodied as an integrated touch-sensitive display operable to be used with a user's finger or a stylus. Optical finger navigation, puck-based input devices, and other known input devices operable to control a pointer are similarly contemplated by the embodiments herein.

Device 108D may be embodied as a laptop computer with input device 120D, embodied with a touchpad 120D and microphone 104D. User system 116 illustrates one embodiment of separate components for receiving different portions of the webconference. Device 108E is a telephone used to receive, and optionally provide, the audio portion of the webconference. Associated device 108F is a personal computer used to receive the visual portion of the webconference. Server 112 may associate devices 108E and 108F with the same user. Users are able to see and hear the webconference on their respective devices 108A-108F. The embodiments herein also contemplate the use of assistance-devices to provide participants with hearing, visual, or mobility impairments with audio, visual, and input means to participate in the webconference.

While users may passively participate in a webconference, such as by watching and/or listening only, one or more users may also participate in the webconference to some degree and contribute to the content thereof. For example, camera 106A and/or microphone 104A may be used by a user of device 108A to present visual and/or audio to the webconference. User of user system 116 would be operable to participate via device 108E and/or 108F. One participant may be a designated host for the webconference. The host may have the ability to perform administrative duties and/or maintain, grant, and/or revoke control of webconference functions to other participants.

In one embodiment, a host transfers the presentation to a second participant to take control of the presentation (e.g., "floor control"). The participant with floor control may have control for all presentation aspects. For example, if the host has floor control and is using device 108A, the host may cause the webconference content to be what is picked up by microphone 104, seen by camera 106A, and identified and/or selected by a pointer controlled by input device 120A.

If the host, using device 108A, then passes floor control to the participant using device 108C, then the user of device 108C then has control to provide webconferencing content via microphone 104C, video, via camera 106B, and identified and/or selected elements by pointing with input device 120C. From there the second participant may keep floor control, pass the floor control back to the host, or pass floor control to a third participant. However, if at some point a participant, who does not have floor control, wishes to ask a question or call attention to a particular visual element of the presentation, passing floor control to that participant may be overly burdensome or otherwise undesirable. However, as provided by certain embodiments herein, a speaking participant may be assigned control of a presentation pointer and thereby provide certain advantages to collaboration sessions, such as webconferences. In particular, control of the pointer may be determined automatically in accord with the detection of the participant speaking. Control of the pointer may then pass to the next speaking participant or back to a host without requiring human intervention.

Figure 2:
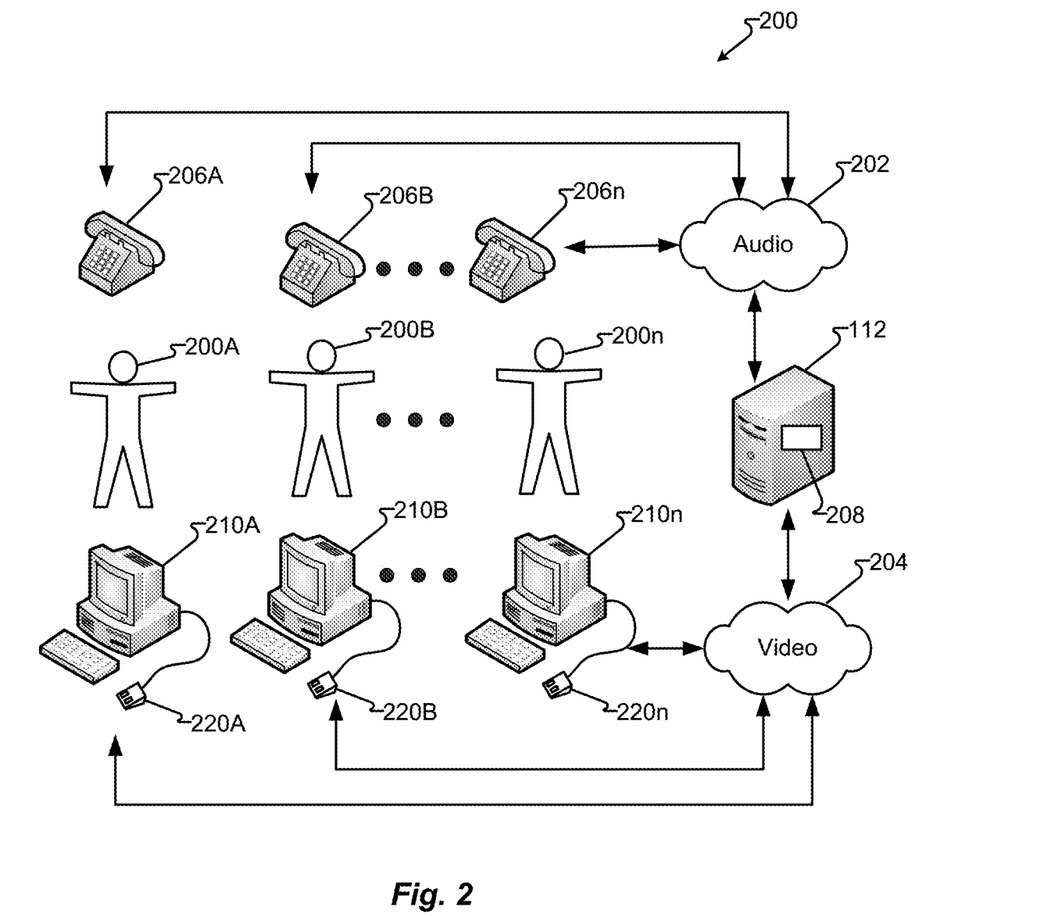
FIG. 2 illustrates a first collaboration system configuration in accordance with embodiments of the present disclosure.

With reference now to FIG. 2, system 200 will be described in accordance with embodiments of the present disclosure. In one embodiment, a webconference is delivered via two distinct channels, an audio channel and a visual or video channel. It should be understood that the term, "video channel" is being used as a convenience to illustrate that, in certain embodiments, the visual aspects of a webconference are provided by a channel distinct from the channel carrying the audio portion of the presentation. The video channel may include live camera feed, or presentation material with or without animation such as is common to share in a collaboration session. The video channel may also include additional data beyond the visual portion of the presentation, such as, control signals, text messaging, and other non-audio portions of the presentation. In one embodiment, video channel utilizes hypertext transfer protocol ("http"), secured hypertext transfer protocol ("https") or similar protocol operable to facilitate the transfer of video packets to a number of devices 210. Devices 206 receiving audio only may be portions of devices that are also able to receive video as well. If so, the other portion of the device corresponds to devices 210 of FIG. 2. Other devices, such as telephone device 206A-206n may be audio only devices and require a second device, such as personal computer devices 210A-210n, to receive video content.

In the embodiment illustrated by system 200 includes telephone devices 206, for audio, and corresponding computer devices 210, for video, as used by participants 200.

More specifically, user 200A uses telephone device 206A and computer device 210A, user 200B uses telephone device 206B and computer device 210B, and user 200n uses telephone device 206n and computer device 210n. Server 112 is able to associate specific participants 200 as being the users of individual telephone devices 206 and computer device 210 pairs. For example, user 200B is the user of both telephone device 206B and computer device 210B. The association may be accomplished by server 112 issuing a conference number, password, and/or personal identification number to individual users 122. Passwords/codes for the audio and video portions may be associated, such that, participants 200 of multiple devices may be identified as one user by server 112.

In the embodiment illustrated, participants 200 utilize telephone devices 206 to connect to audio network 202 and receive the audio portion of the webconference provided by server 112. Audio network 202 may be a public switched network, enterprise network, cellular telephone network, telephony portion of a session-initiation protocol network, or other network operable to convey bi-directional audio signals, and including combinations of two or more thereof. Telephone devices 206 may be one or more of conventional copper-wire telephones, digital phones, cellular phones, smartphone, or other devices with audio functionality. Computer devices with telephony capability may also be used as at least one of telephone devices 206.

Participants 200 utilize computer devices 210 to connect to video network 204 and receive the visual portion of the webconference provided by server 112. Video network 204 may be a public network (e.g., the Internet), private network, or a combination thereof.

Speaker detection module 208 may be implemented as a component of server 112. Participant 200B, using telephone device 206B, may begin speaking. Speaker detection module 208 then detects participant 200B as the active speaker and causes the presentation software to offer control of a pointer to participant 200B, via computer device 210B and input device 220B. In another embodiment, speaker detection module 208 may be implemented on a peripheral device with connectivity to server 112.

Figure 3:
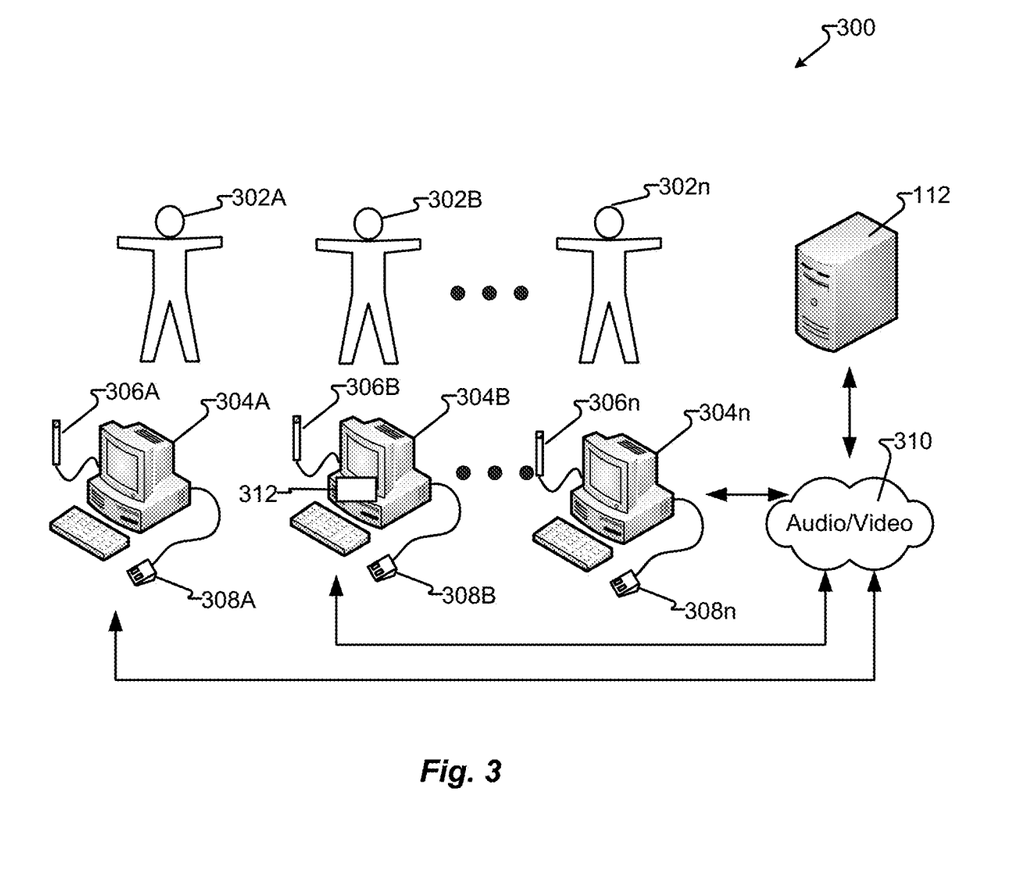
FIG. 3 illustrates a second collaboration system configuration in accordance with embodiments of the present disclosure.

With reference now to FIG. 3, system 300 will be described in accordance with embodiments of the present disclosure. System 300 illustrates one embodiment of server 112 configured to provide audio and video portions of a webconference utilizing a converged audio/video network 402 for both the audio and video portions of the presentation. In one embodiment, speaker detection module 208 (see FIG. 2) may be embodied within server 112 whereby control of pointer 208 may be passed to the active speaker. In another embodiment, speaker detection module 312 may be embodied in one or more client computers, such as computer device 304B. When participant 302B begins to speak, microphone 306B detects the sound and, speaker detection module 312 signals server 112 that user 302B is speaking. Webconferencing software, such as that running on server 112, may then identify user 302B and provide control of a pointer to user 302B to control via input device 308B whereby all participants 302 may view the pointer on their respective devices.

In another embodiment, a combination of system 200, whereby the audio and video portions are distinct, and system 300, whereby the audio and video portions are combined, is also provided herein. The audio portion is delivered via an audio channel, which may comprise portions of an audio-only network, such as network 202, or an audio portion of an audio/video network, such as audio/video network 310. The audio channel used in audio/video network may be distinguished by port, protocol, packet header information, and/or other means by which the audio portion is operable to be identified. In such a mixed network, the means to identify the speaker and offer, and optionally transfer, pointer control may similarly be mixed, such that participants, regardless of client or network hardware, may be detected to be the active speaker and take control of a pointer when determined to be speaking.

Figure 4A:
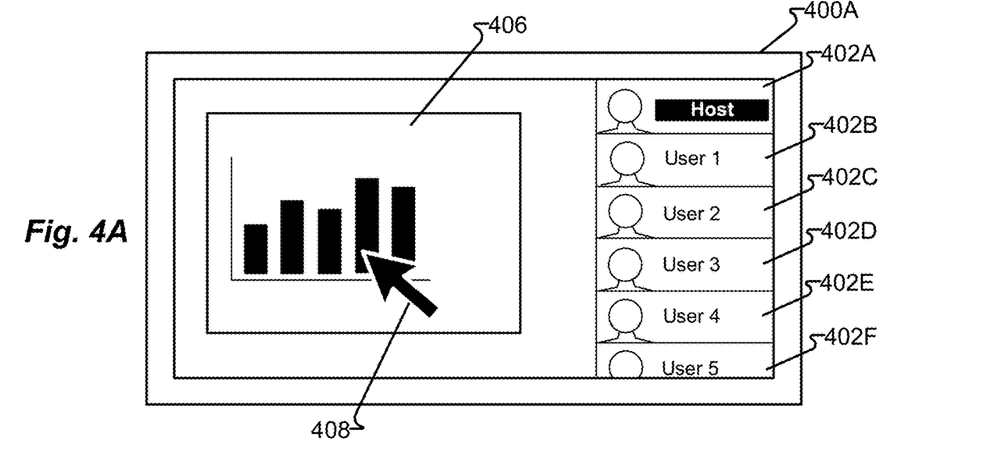
FIGS. 4A-4C illustrate a display in accordance with embodiments of the present disclosure.
Figure 4B:
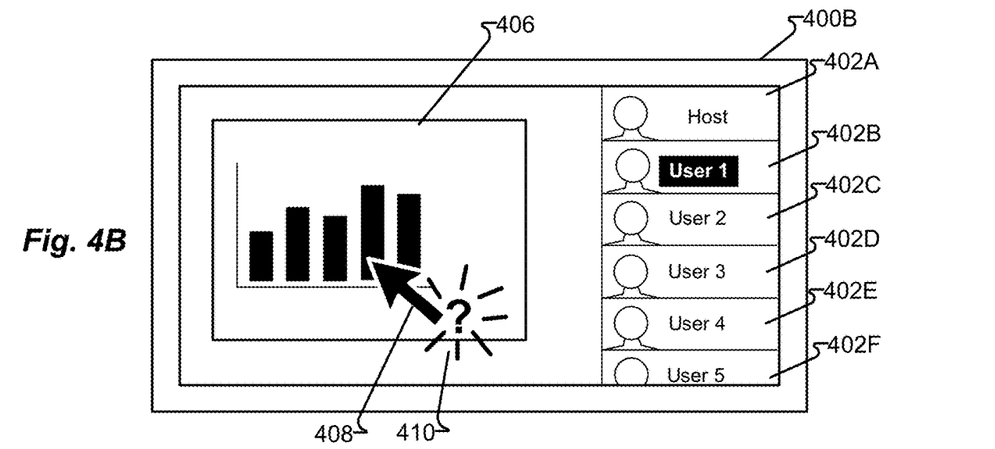
Figure 4C:
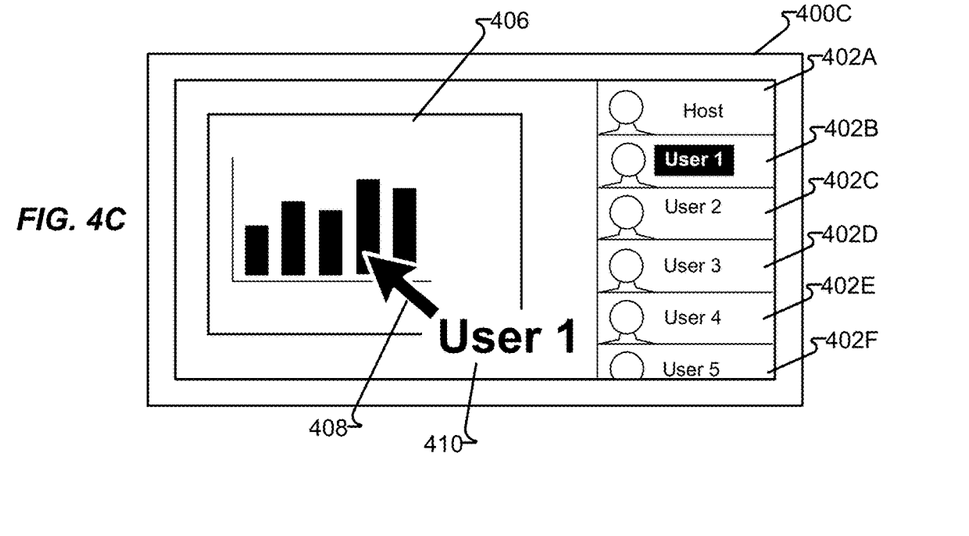

With reference now to FIGS. 4A-4C, display 400 will be described in accordance with embodiments of the present disclosure. In one embodiment, display 400 is the display of at least one device 108A-108D, 108F, 210, and 304. Display 400A shows presentation content 406 and pointer 408. Participants, such as participants 200, 302, in the webconference are represented by image and/or text labels 402A. Presenter label 402A is currently highlighted to indicate to the other participants that "Host" 402A is speaking. To avoid unnecessary complication of the figures, only user labels 402A-402F are illustrated. However, as is known in the art, a greater or fewer number of user labels 402 may be presented without departing from the scope of the present disclosure. For instance, additional users may be presented in display 400 by paging, scrolling, or similar operations.

As referenced above, prior or during the webconference, one participant may be a designated as a host and represented by host label 402A. The host currently has control of the presentation whereby pointer 408 and the presentation content 406 is under the control of the host. While the host may have control of pointer 408, as described herein, control of pointer 408 may be taken by another participant in response to the other participant speaking, however, the host would maintain administrative and/or presentation control unless expressly assigned.

Many webconferences are interactive and may include input from the participants. In one embodiment, participant 302B has begun speaking using microphone 306B on computer device 304B. Participant 302B, associated with user label 402B ("User 1"), speaks and other participants are presented with the audio from microphone 306B. As is known in the art of webconferencing software, computer device 304B may notify the other participants who is the current speaker such as by showing label 402B, associated with participant 302B, as highlighted. Host label 402A may also be de-highlighted accordingly.

In another embodiment, display 400B is a display presented by computer device 304B to participant 302B upon participant 302B beginning to speak into microphone 306B. As may be presented to all participants, user label 402B may similarly be highlighted and host label 402A similarly de-highlighted. While participant 302B is speaking, control of pointer 408 is given to participant 302B. In a further option, control of pointer 408 is offered to participant 302B while speaking, who may or may not accept control. In one embodiment, control may be accepted by an input on mouse input device 308B. If participant 302B does not accept control, control may remain with the previous speaker or revert back to the host. To determine if participant 302B wishes to take control while speaking, participant 302B may be notified that control is an option, such as by a flashing question mark 410, changing the pointer color, message, sound, or other indicator. If participant 302B then moves input device 308B, such as to point within the conference presentation window in a manner associated with the presentation, participant 302B will be granted control, if not already provided, and the other participants in the webconference will then see pointer 408 moving under the control of participant 302B.

Pointer 408 may be enhanced to indicate that control of pointer 408 has not been decided. For example, participants 302A and 302B may both be talking in either short, alternating manner or speaking over each other. Control may be made available to any speaker, even a new speaker who joins the banter, or restricted to just the currently speaking participants 302A and 302B. As such, if participant 302B stops talking, control pointer 408 may then made available to participant 302A.

The other participants may know who is speaking by virtue of user label 402B being highlighted. If participant 302B, associated with user label 402B, then speaks and then controls pointer 408, it may be apparent from the audio of participant 302B that participant 302B is controlling pointer 408. However, in another embodiment, control of pointer 408 is explicitly identified. In one embodiment, display 400C shows pointer 408 with text 410 identifying "user 1" as the controller of pointer 408.

In yet another embodiment, pointer 408 may be embellished to illustrate that participant 302B, as the controller of pointer 408 has performed a pointer operation, such as a left click, right click, double click, and so on. Pointer 408 may then indicate such an action in the form of a balloon, changed color, displaying a message, or other visual cue. Such a change may occur for set duration or until another operation is detected. Certain operations may be a specialized meaning in the presentation. For example, holding a mouse button down may cause a magnification dialog to be presented on the display, a highlight function, or other presentation to view or enhance a particular visual portion of the presentation. In a further embodiment, server 112 or other component may insert a sound into the audio portion of the webconference such that the other participants may hear a representation of the pointer operation.

In still another embodiment, when the active speaker stops speaking. The pointer 408 may be reset to indicate no speaker is currently controlling pointer 408. Alternatively, control may default back to a designated participant, such as the host, and pointer 408 may then indicate host control accordingly.

Figure 5:
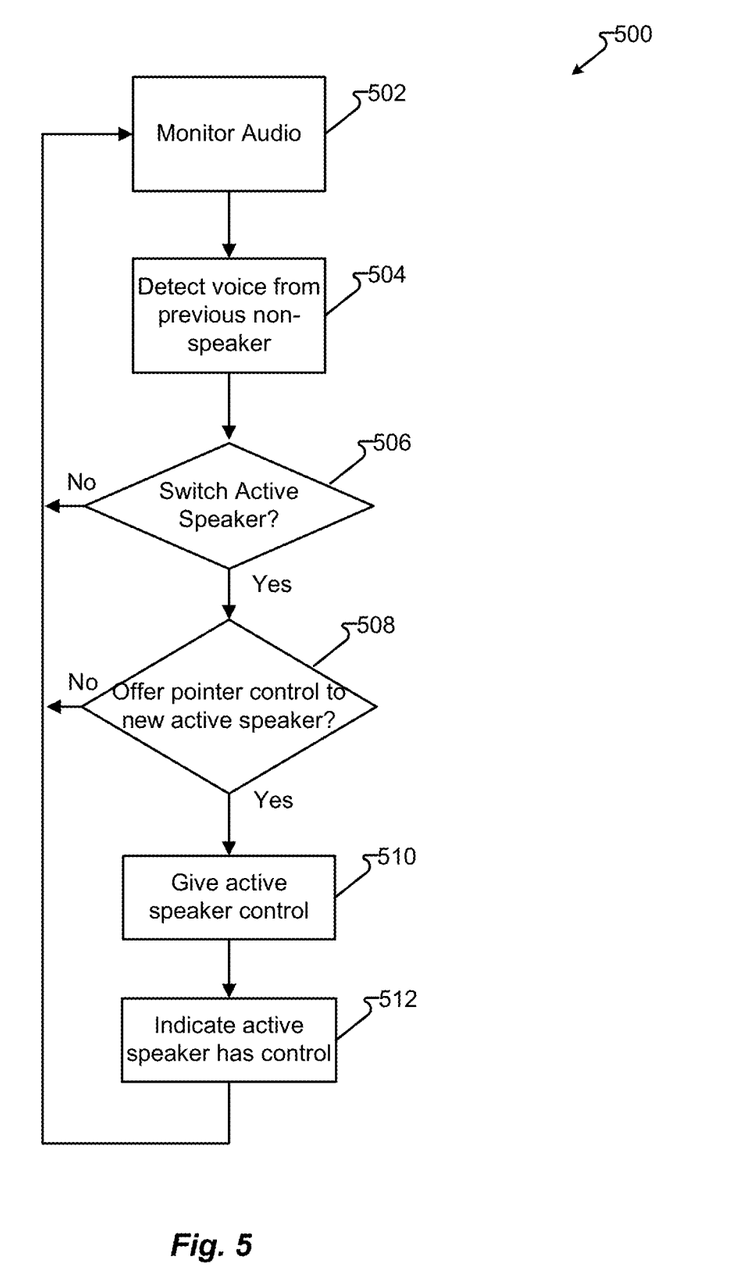
FIG. 5 illustrates a process for assigning pointer control to an active speaker in accordance with embodiments of the present disclosure.

With reference now to FIG. 5, process 500 will be described in accordance with embodiments of the present disclosure. In one embodiment, a webconference with an audio and video portion is established, such as by server 112 for a number of participants using devices 108, 210, 206, and/or 304. Step 502 monitors the audio portion of the webconference and step 504 detects a voice from a previous non-speaker. Step 506 determines if the active speaker should be switched to the speaker detected in step 504. The decision of step 506 may be based on the duration the person is speaking, the presence of other speakers, a control set by a host, or other criterion. If step 506 determines the answer is no, processing may continue back to step 502. If step 506 determines the answer is yes, step 508 determines if the active speaker is to be offered control of the presentation pointer, for example, pointer 408. Like in step 506, the decision to offer pointer control to the active speaker may be based on the duration the person is speaking, the presence of other speakers, a control set by a host, or other criterion. For example, in one webconference, speaking is well structured and participants are either silent or will speak for a length of time and so the threshold may be low, such that a speaker may gain control soon after he or she begins to speak. In another example, a presentation is more interactive whereby the participants audibly fight for control and only after some period of time, when the winner of the control is determined, does step 508 offer control of the pointer to the winner. If step 508 determines the answer is no, processing may continue back to step 502.

If step 508 determines the active speaker is to be offered pointer control, processing continues to step 510, whereby the active speaker is given control of the pointer. Optionally, step 512 may indicate the pointer is under control by the new active speaker. Processing may then loop back to step 502 whereby the next new speaker may be offered control according to process 500. Process 500 may loop until the webconference is terminated or earlier, such as upon a host's decision to discontinue process 500.

In another embodiment, process 500 may be modified by administrative and/or user settings to avoid unnecessarily changing control. In still other embodiments, the active speaker may be provided with an indicator offering control of the pointer. If the active speaker moves their input device to indicate acceptance, such as by placing their pointer within the presentation window, the speaker may indicate acceptance of control of the pointer. If the active speaker does not wish to take control, the control of the pointer may reside with another participant or remain unowned until a new active speaker is identified.

In still another embodiment, an administrator, such as a host, may be able to selectively override control of pointer provided by step 510, regardless of whether another participant is speaking.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    establishing, by a server connected to a network, a collaboration session between a first device connected to the network and a second device connected to the network, the collaboration session having an audio portion and a visual portion, and wherein the visual portion comprises a visual content of the collaboration session and a pointer;
    monitoring, by the server, activity on the audio portion;
    determining, by the server, that the second device is active on the audio portion;
    in response to determining that the second device is active on the audio portion, transferring, by the server, pointer control of the pointer, from the first device to the second device, thereby enabling the second device to affect the pointer of the visual portion while the first device maintains control of the visual content of the visual portion; and
    wherein transferring pointer control to the second device is conditional upon determining, by the server, that a second user associated with the second device has been speaking for a length of time beyond a threshold amount of time.

2. The method of claim 1, the first device is a host of the collaboration session and the second device is a non-host participant of the collaboration session even while the second device has pointer control.

3. The method of claim 1, further comprising, in response to determining that the second device is active on the audio portion, providing, by the server, an indication to the second device that pointer control is transferred to the second device.

4. The method of claim 3, wherein transferring pointer control to the second device is conditional upon the second device indicating an intention to have pointer control.

5. The method of claim 1, further comprising, displaying, by the server, an indicia of control in the visual portion in accord with the one of the first and second device having pointer control.

6. A system, comprising:
    a server, connected to a network and comprising at least one processor and a memory, operable to present via the network an audio portion of a collaboration session on an audio channel and a visual portion of the collaboration session on a video channel, the visual portion comprising a visual content of the collaboration session and a pointer;
    a speaker detection module operable to determine that an active device from a number of devices is active on the audio portion;
    a pointer control assignment module of the server operable to assign control of the pointer to the active device and not operable to assign the visual content in the visual portion; and
    an administrative module, of the server, operable to modify the pointer control assignment module to perform at least one of revoke pointer control assigned to the active device, prevent at least one of the number of devices from being assigned control of the pointer, and determine a speaking threshold amount of time that must be met by an active user associated with the active device prior to the active device being assigned control of the pointer.

7. The system of claim 6, wherein the speaker detection module is a component of the server.

8. The system of claim 6, further comprising, a pointer acceptance module, of the server, operable to notify the active device of an availability to have pointer control assigned thereto and signal the pointer control assignment module upon receiving an indicia of the active device's intent to be assigned pointer control.

9. The system of claim 6, wherein:
    the network comprises a first network and a second network; and
    the audio portion is provided via the first network using a first communication protocol whereas the visual portion is provided via the second network using a second communication protocol.

10. The system of claim 6, wherein the audio channel and the video channel are provided within a same delivery channel.

11. A system, comprising:
    means to establish a collaboration session with a first and second device, the collaboration session having an audio portion delivered via an audio channel and a visual portion, wherein the visual portion comprises a visual content of the collaboration session and a pointer, delivered via a video channel, and the visual portion being controlled by the first device;
    means to monitor the audio portion;
    means to determine that the second device is active on the monitored audio portion;
    upon the second device being active on the audio portion, means to transfer control of the pointer of the video portion to the second device while the first device maintains control of the visual content of the visual portion; and
    wherein the means to transfer control of the pointer to the second device is conditional upon determining that a second user associated with the second device has been speaking for a length of time beyond a previously determined threshold.

12. The system of claim 11, wherein the first device is a host of the collaboration session and the second device is a non-host participant of the collaboration session even while the second device has pointer control.

13. The system of claim 11, further comprising, means to, upon determining the second device is active on the audio portion indicate that the second device has pointer control available thereto.

14. The system of claim 13, wherein means to transfer control of the pointer to the second device is conditional upon the second device indicating an intention to have control of the pointer.

15. The system of claim 11, further comprising, means to display an indicia of control in the visual portion in accord with the one of the first and second device having pointer control.

16. The method of claim 3, further comprising, in response to determining that the second device is active on the audio portion, providing offering pointer control to the second device.

17. The system of claim 11, further comprising, means to offer pointer control to the second device in response to determining that the second device is active on the audio portion.

* * * * *